United States Patent
Ryne et al.

(10) Patent No.: US 11,358,626 B2
(45) Date of Patent: Jun. 14, 2022

(54) SYSTEM, METHOD AND APPARATUS FOR A TELESCOPIC JACKET FOR A STEERING COLUMN

(71) Applicant: Steering Solutions IP Holding Corporation, Saginaw, MI (US)

(72) Inventors: Patrik M. Ryne, Lake Orion, MI (US); George E. Arlt, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/033,229

(22) Filed: Sep. 25, 2020

(65) Prior Publication Data

US 2021/0129891 A1 May 6, 2021

Related U.S. Application Data

(60) Provisional application No. 62/931,398, filed on Nov. 6, 2019.

(51) Int. Cl.
*B62D 1/185* (2006.01)

(52) U.S. Cl.
CPC .................................... *B62D 1/185* (2013.01)

(58) Field of Classification Search
CPC ........ B62D 1/185; B62D 1/183; B62D 1/181; B62D 1/187; B62D 1/189
See application file for complete search history.

(56) References Cited

U.S. PATENT DOCUMENTS

| | | | |
|---|---|---|---|
| 7,444,900 B2 * | 11/2008 | Tomaru .................. | B62D 1/181 74/493 |
| 10,661,819 B2 | 5/2020 | Heitz et al. | |
| 2007/0137381 A1 * | 6/2007 | Arihara ................. | B62D 1/181 74/493 |
| 2009/0100956 A1 | 4/2009 | Warashina | |
| 2017/0113710 A1 * | 4/2017 | Matsuno ............... | B62D 1/187 |

(Continued)

FOREIGN PATENT DOCUMENTS

| | | |
|---|---|---|
| DE | 102015216326 A1 | 6/2016 |
| DE | 102015224602 A1 | 6/2017 |

(Continued)

OTHER PUBLICATIONS

German Examination Report with translation corresponding to German Application No. DE 10 2020 129 086.1 dated Apr. 12, 2021.

*Primary Examiner* — Drew J Brown
(74) *Attorney, Agent, or Firm* — Dickinson Wright PLLC

(57) ABSTRACT

A steering column assembly including a steering column that extends between a first end and a second end and includes a hand wheel location on the first end and a rotation output on the second end. The steering column comprising an upper jacket, a lower jacket, and a sliding bracket, wherein the upper jacket is telescopically connected to the lower jacket and the lower jacket is slidably connected to the sliding bracket. A telescopic actuator extends between the sliding bracket and the upper jacket and facilitates relative telescopic movement between the upper jacket and the lower jacket and slidable movement between the lower jacket and the sling bracket. The lower jacket including a shaft connected to the rotation output via a splined inner bore that permits axial play. The movement of the lower jacket resulting in translational movement of the shaft.

12 Claims, 8 Drawing Sheets

(56) References Cited

U.S. PATENT DOCUMENTS

| | | | | |
|---|---|---|---|---|
| 2018/0355958 A1* | 12/2018 | Graham | .............. | F16H 25/2454 |
| 2019/0322307 A1* | 10/2019 | Kwon | .................... | B62D 1/181 |
| 2021/0061340 A1* | 3/2021 | Wilkes | ................... | B62D 1/181 |
| 2021/0129894 A1* | 5/2021 | Ryne | ...................... | B60K 37/06 |

FOREIGN PATENT DOCUMENTS

| | | | | |
|---|---|---|---|---|
| DE | 102018212696 B3 * | 11/2019 | ......... | F16H 25/2056 |
| DE | 102019209114 A1 | 12/2020 | | |
| DE | D E-102019209114 A1 * | 12/2020 | ............. | B62D 1/181 |
| WO | WO-2021049803 A1 * | 3/2021 | ............... | B62D 1/19 |

\* cited by examiner

SYSTEM, METHOD AND APPARATUS FOR A TELESCOPIC JACKET FOR A STEERING COLUMN

CROSS-REFERENCE TO RELATED APPLICATION

This U.S. Utility Patent Application claims the benefit of and priority to U.S. Provisional Patent Application Ser. No. 62/931,398, filed on Nov. 6, 2019, and titled "System, Method and Apparatus for a Telescopic Jacket For a Steering Column," the entire disclosure of which is hereby incorporated by reference.

FIELD OF THE INVENTION

The embodiments described herein relate to vehicle steering systems and, more particularly, to a steering column with a combination of two or more of telescopic, sliding, or translational movement.

BACKGROUND

Conventional steering columns can be manually operated or electronically adjusted via actuators. Depending on the user requirements, such columns can be adjusted in various directions, including along the axis of the steering column and/or rake (i.e., tilt) directions. Steering columns can move axially in several ways. For example, some steering columns telescope via telescoping jackets or shafts or may include one jacket or shaft that is slidable on a track and rail system of another component of the steering column.

Power axially adjustable steering columns typically have one actuator and two telescopic jackets. One jacket is usually pinned at the rack pivot point, and the other jacket can translate with the hand wheel. The actuator can adjust the distance between the two jackets to provide the telescope function of the hand wheel. For normal amounts of telescoping (e.g., +/−30 mm), this design is sufficient and it packages within the typical column space. The limit to the amount of telescopic travel is the axial package space available between the front of dash and the rear of dash.

Conventional solutions also have other limitations. Telescopic steering columns can increase the amount of space required by the steering column assembly to operate in the underlying structure. As some end use applications are actually decreasing the space available for steering column assembles, the existing telescopic solutions are becoming an issue.

In the past, a function of telescoping steering columns was to provide flexibility in the location of the hand wheel and facilitate more comfortable driving positions for different sizes of drivers. Now there are opportunities for significantly more telescopic travel, which also may be referred to as stow travel (i.e., when the hand wheel is not needed). For example, the hand wheel could be repositioned completely away from the driver to allow him or her to do things other than operate the vehicle, such as work on a laptop computer when the vehicle is parked. Other examples include vehicles with autonomous driving capability, such that the hand wheel could be stowed when the vehicle is in an autonomous driving mode. For a significantly greater amount of telescopic and stow capacity, conventional steering column solutions will not package between the rear of dash and the front of dash for any normal passenger vehicle. Thus, improvements in the compact adjustment of steering columns continue to be of interest.

SUMMARY

According to one aspect of the disclosure, a steering column assembly is provided. The steering column assembly includes a steering column extending along a longitudinal axis between a first end and a second end and has a hand wheel location on the first end and a rotation output on the second end. The steering column includes an upper jacket located at the first end, a lower jacket telescopically connected to the upper jacket and extending towards the second end, and a sliding bracket slidably connected to the lower bracket and extending further towards the second end. The steering column assembly further includes at least one longitudinal actuator that telescopically moves the upper jacket with respect to the lower jacket and slidably moves the lower jacket with respect to the sliding bracket.

According to another aspect of the disclosure, a steering column assembly is provided. The steering column assembly includes a steering column extending along a longitudinal axis between a first end and a second end and has a hand wheel location on the first end and a rotation output on the second end. The steering column includes an upper jacket located at the first end and a lower jacket telescopically connected to the upper jacket and extending towards the second end. The lower jacket includes a shaft extending to the rotational output. The steering column assembly further includes a longitudinal actuator that telescopically moves the upper jacket with respect to the lower jacket and further causes translating movement of the shaft with respect to the lower jacket.

According to yet another aspect of the disclosure, a steering column assembly is provided. The steering column assembly includes a steering column extending along a longitudinal axis between a first end and a second end and has a hand wheel location on the first end and a rotation output on the second end. The steering column includes an upper jacket located at the first end, a lower jacket telescopically connected to the upper jacket and extending towards the second end, and a sliding bracket slidably connected to the lower bracket and extending further towards the second end. The lower jacket includes a shaft extending to the rotational output. The steering column assembly further includes a longitudinal actuator that telescopically moves the upper jacket with respect to the lower jacket and slidably moves the lower jacket with respect to the sliding bracket while further causing translating movement of the shaft with respect to the lower jacket.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
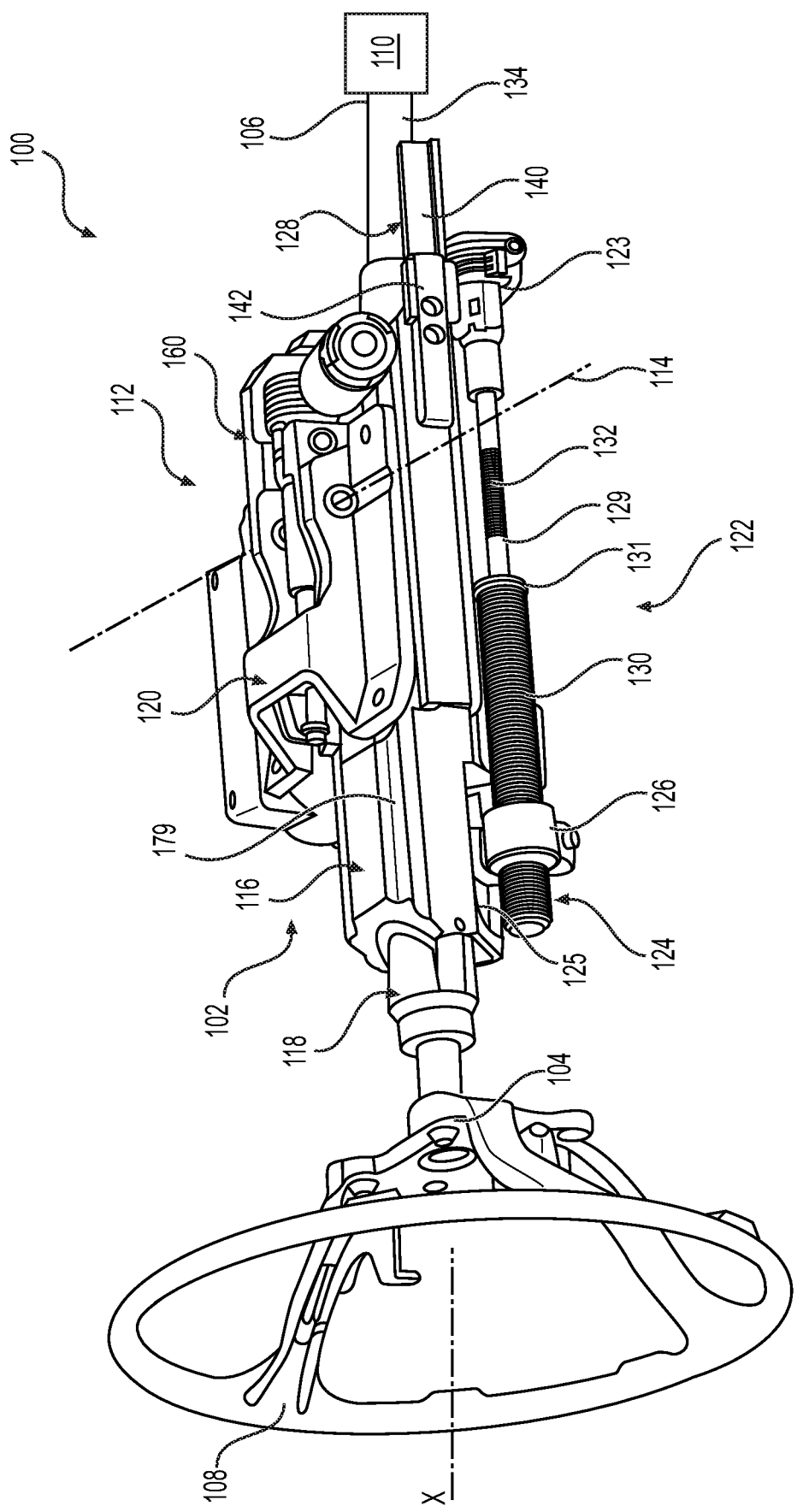
FIG. 1 is an isometric view of a steering column assembly including a steering column extending along a longitudinal axis.

Referring now to the drawings, where the various embodiments are shown and described herein, without limiting same, FIGS. 1-8 illustrate embodiments of a system, method and apparatus for a steering column assembly that permits rake and axial movement. The axial movement includes a combination of two or more of telescopic, sliding, or translational movement.

With reference initially to FIG. 1, a steering column assembly 100 in accordance with the present invention is isometrically illustrated. The steering column assembly 100 includes a steering column 102 extending along a longitudinal axis X between a first end 104 and a second end 106. A rotational input 108, such as a steering wheel, is located on the first end 104 (hand wheel location) and a rotation output 110 is located on the second end 106. The rotation output 110 may include a pinion shaft assembly, an I-shaft, a cardan joint, steer-by-wire components or any other features conventionally located opposite the steering wheel 108. The steering column assembly 100 includes a rake bracket assembly 112 located between the first end 104 and the second end 106. The rake bracket assembly 112 includes a pivot axis 114 and facilitates rake movement of the steering column 102 about the pivot axis 114, which is disposed transverse to the longitudinal axis X. As such, when the steering column 102 is tilted with respect to the pivot axis 114, vertical movement of the first end 104 may be equal or substantially equal (within 80%) but opposite to the movement of the second end 106. However, it should be appreciated that the location of the pivot axis 114 can vary dramatically based on rake and packaging requirements.

With continued reference now to FIG. 1, the steering column 102 may be both rake and axially adjustable and include a lower jacket 116 and an upper jacket 118. The rake bracket assembly 112 includes a mounting bracket 120 that is operatively coupled to the steering column 102. The lower jacket 116 and the upper jacket 118 may be disposed about the longitudinal axis X. The upper jacket 118 may be the outer jacket defining an inner bore (not shown) and/or, alternatively, may be the inner jacket (FIG. 1). The upper jacket 118 may further include a track 119 (FIG. 3) that receives at least a portion of the lower jacket 116. The lower jacket 116 likewise may be the outer jacket and define an inner bore (FIG. 3) and/or alternatively may be the inner jacket (not shown). The lower jacket 116 may further include a slider 121 (FIG. 3) that mates with the track 119 of the upper jacket 118 to facilitate axial travel and reduce lash. As illustrated in the example embodiment in FIG. 3, the upper jacket 118 is an inner jacket and the lower jacket 116 is an outer jacket that is received within a bore in the upper jacket 118. The track 119 in the upper jacket 118 defines a groove along which the slider 121, which may include ball bearings, can travel during telescopic movement. The steering column 102 further includes a sliding bracket 128 that slidably connects to the lower jacket 116 or the upper jacket and allows for additional axial expansion and contraction. Further details of the axially slidable connection between the sliding bracket 128 and one or both of the jackets 116, 118 will be described in greater detail in the description of FIG. 3.

Figure 2:
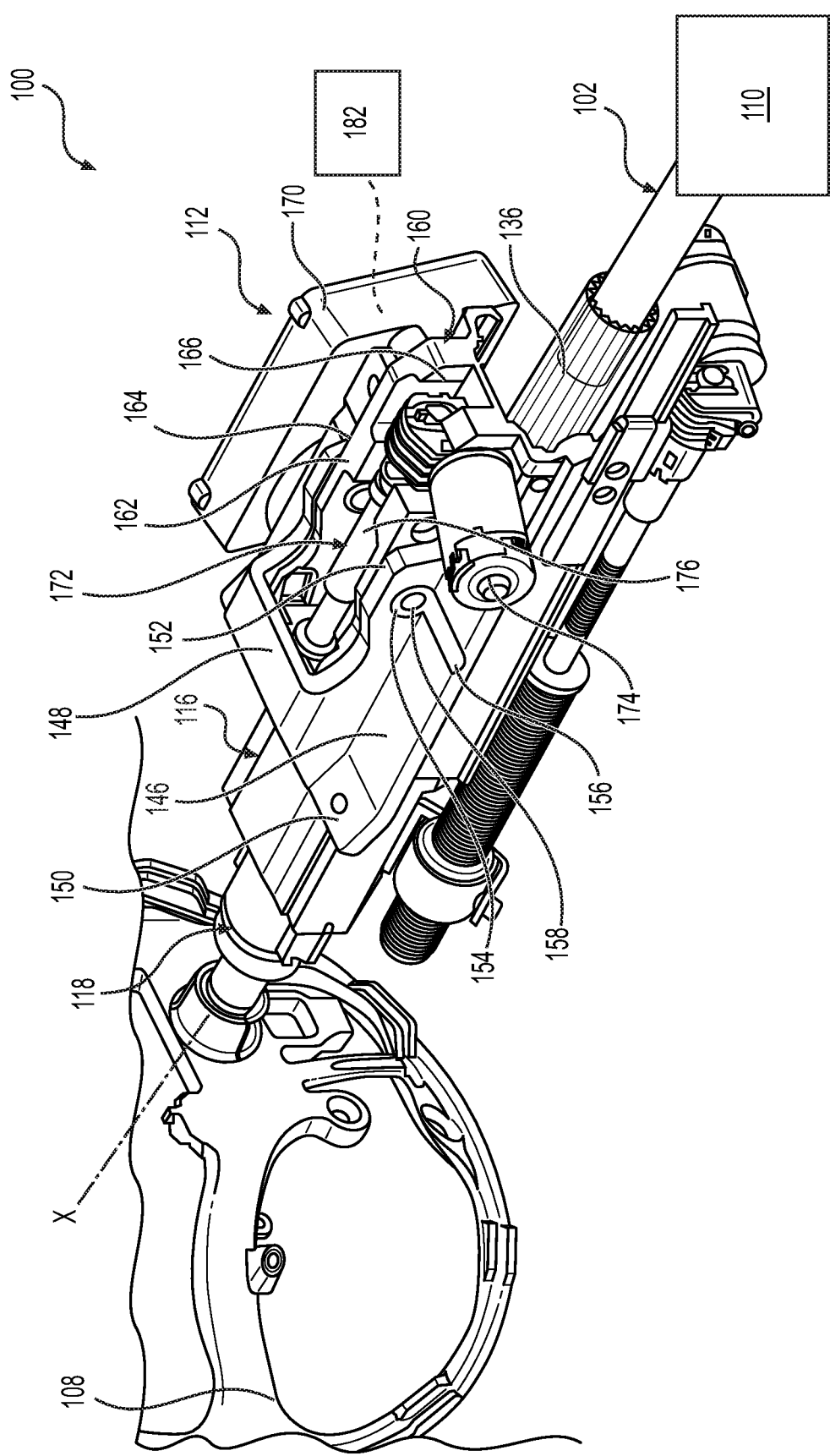
FIG. 2 is another isometric view of the steering column assembly illustrating a rake bracket assembly for tilting the steering column about a pivot axis that is transverse to the longitudinal axis.
Figure 3:
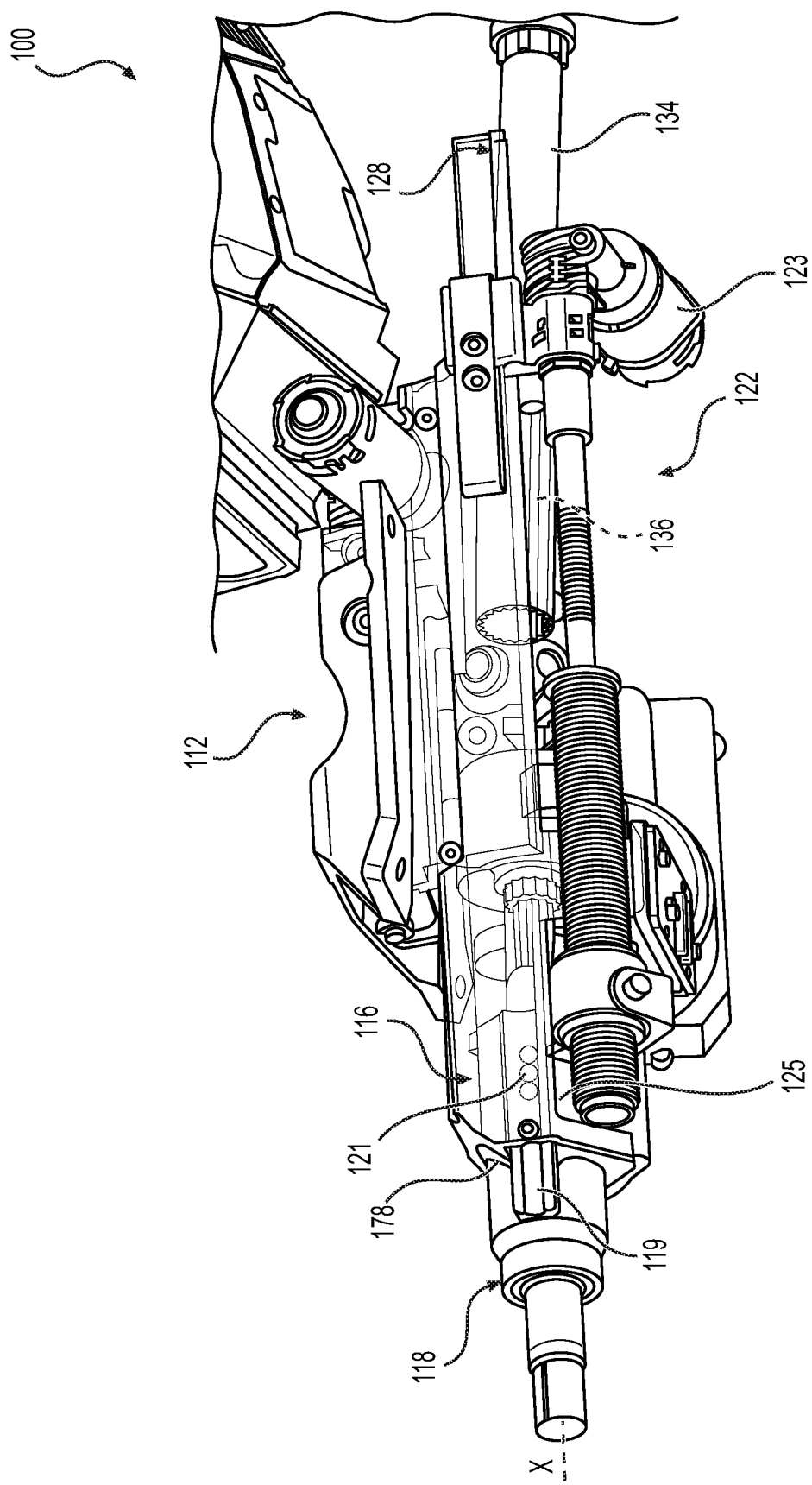
FIG. 3. is an alternate isometric view of the steering column assembly illustrating that the steering column includes a pair of telescoping jackets and a slidable bracket that are each connected to allow the steering column to expand and contract along the longitudinal axis.

With reference now to FIGS. 1-3, telescopic movement of one jacket 116, 118 relative to the other jacket 116, 118 is along the longitudinal axis X and may be by operation of a longitudinal actuator 122. More particularly, the longitudinal actuator 122 may include a motor 123 and a gear mechanism 124 (such as a lead screw assembly or worm gear assembly) that connects to one jacket 116, 118 on a first end and the sliding bracket 128 on a second end. The gear mechanism 124 may further include a spindle nut 126 connected to the upper jacket 118 through a window 125 in the lower jacket 118. The longitudinal actuator 122 further includes a spindle 129 (e.g., lead screw) extending between the spindle nut 126 and the sliding bracket 128. The spindle 129 may include outer helical teeth intermeshed with the spindle nut 126. As such, the motor 123 may rotate the spindle nut 126 causing movement of the spindle 129 along the longitudinal axis X depending on the direction of rotation. Alternatively, the motor 123 may directly rotate the spindle 129 which is intermeshed with the spindle nut 126 that is static. The spindle 129 may include an outer spindle shaft 130 (e.g., outer lead screw) defining a bore and an inner spindle shaft 132 (e.g., inner lead screw) received within the bore, wherein the inner spindle shaft 132 is located in the bore when the longitudinal actuator 122 telescopically contracts (compresses) the upper and lower jackets 116, 118. When the longitudinal actuator 122 telescopically expands the upper and lower jackets 116, 118, the inner spindle shaft 132 at least partially exits the bore. The bore of the outer spindle shaft 130 and the inner spindle shaft 132 may both include meshed teeth to facilitate axial movement. Alternatively, the outer spindle shaft 130 and the inner spindle shaft 132 may be connected by a floating nut 131 located therebetween statically connected to the outer spindle shaft 130 and having internal teeth, statically connected to the inner spindle shaft 132 and having outer teeth, or having both outer teeth and inner teeth. In some versions, two stoppers (not shown) can be included to limit the amount of translation of the floating nut 131 relative to the inner and outer spindles 130, 132.

The steering column 102 may include a shaft 134 near the second end 106 and axially connected to the lower jacket 116. For example, the shaft 134 may include a splined inner bore 136 (FIGS. 2 and 3) that connects to the rotation output 110) and allows a certain amount of play along the longitudinal axis X. The rotation output 110 may include a cardan joint or yoke. However, in certain arrangements, the rotation output 110 includes other components including those conventionally found in steer-by-wire applications. The sliding bracket 128 may include a rail 140 and clip 142 that allows the connection location of the sliding bracket 128 to be modified with respect to the lower jacket 116 and/or the longitudinal actuator 122. As such, the maximum expansion of the steering column along the longitudinal axis X may be adjusted for various implementations and vehicular packaging requirements. The steering column 102 is operatively connected to a vehicle structure via the mounting bracket 120, the mounting bracket 120 may connect to an intervening component or directly to the vehicle structure. In embodiments wherein the steering column 102 includes the lower jacket 116 and the upper jacket 118, the mounting bracket 120 may be operatively connected to whichever jacket 116, 118 is the outermost jacket 116, 118. In addition, as illustrated in FIGS. 1-8, the mounting bracket 120 may connected to the sliding bracket 128, which in turn, is connected to the lower jacket 116.

As best shown in FIG. 2, the mounting bracket 120 includes a pair of plate portions 146 connected via a bridge portion 148. The pair of plate portions 146 may be flat and extend along the longitudinal axis X and the bridge portion 148 may extend upwardly and transverse from the longitudinal axis X for locating additional parts between the pair of plate portions 146 on the same or substantially same plane. Each of the plate portions 146 includes an angled tail 150 towards the first end 104 for facilitating connection to the vehicle and accommodating the rake movement of the steering column 102 and adjacent components. The bridge portion 148 is located at least partially on the angled tails 150 and extends to a pair of flange portions 152 that extend upwardly and transverse to the longitudinal axis X along an inner edge of the plate portions 146. The flange portions 152 include a first set of pivot apertures 154 near areas of the flange portions closer to the second end 106. A corresponding groove 156 is defined by plate portions 152 to accommodate insertion of a pivot pin 158.

With continued reference to FIG. 2, the rake bracket assembly 112 further includes a rake bracket 160 that is connected between the mounting bracket 120 and the steering column 102 and pivotally connects to at least one of the steering column 102 and the mounting bracket 120 to facilitate rake movement of the steering column 102. The rake bracket 160 may include a pair of rake flange portions 162 that correspond in shape and orientation to the flange portions 152 of the mounting bracket 120. More particularly, the rake flange portions 162 define a space therebetween and further include corresponding pivot apertures 164 for receiving the pivot pin 158. The rake flange portions 162 may extend further towards the second end 106 than the flange portions 152 of the mounting bracket 120. An area of at least one of the rake flange portions 162 may include a recess 166 for accommodating various additional components that will be described in further detail below. The rake bracket 160 may further connect to or be integral with the sliding bracket 128, which, in turn, connects to the steering column 102, such as the outermost jacket 116, 118. An electrical housing 170 may be connected to a portion of the rake bracket 160, such as the rake flange portions 162, that extend further towards the second end 106 than the corresponding portions of the mounting bracket 120. Details of the electrical housing 170 will be provided below. A rake adjustment actuator 172 may be operably connected to the steering column 102 and be placed within recess 166. For example, the rake adjustment actuator 172 may include a motor 174 and a motor driven gear mechanism 176 similar to the longitudinal actuator 122, or may alternatively be a piston-type mechanism.

FIG. 3 is an alternate isometric view of the steering column assembly 100 illustrating the axial connections between the jackets 116, 118 and the sliding bracket 128. More particularly, the lower jacket 116 receives the upper jacket 118 within a bore 178 and allows respective telescopic movement therebetween and the lower jacket 116 slidably connects to the sliding bracket 128 allowing sliding movement therebetween. The longitudinal actuator 122 may connect between the upper jacket 118 and the sliding bracket 128 (e.g., the clip 142) such that the lower jacket 118 effectively floats between the upper jacket 118 and the sliding bracket 128. The slidable connection between the lower jacket 118 and the sliding bracket 128 includes intermeshed longitudinal keyways 179 (FIG. 1).

Figure 4:
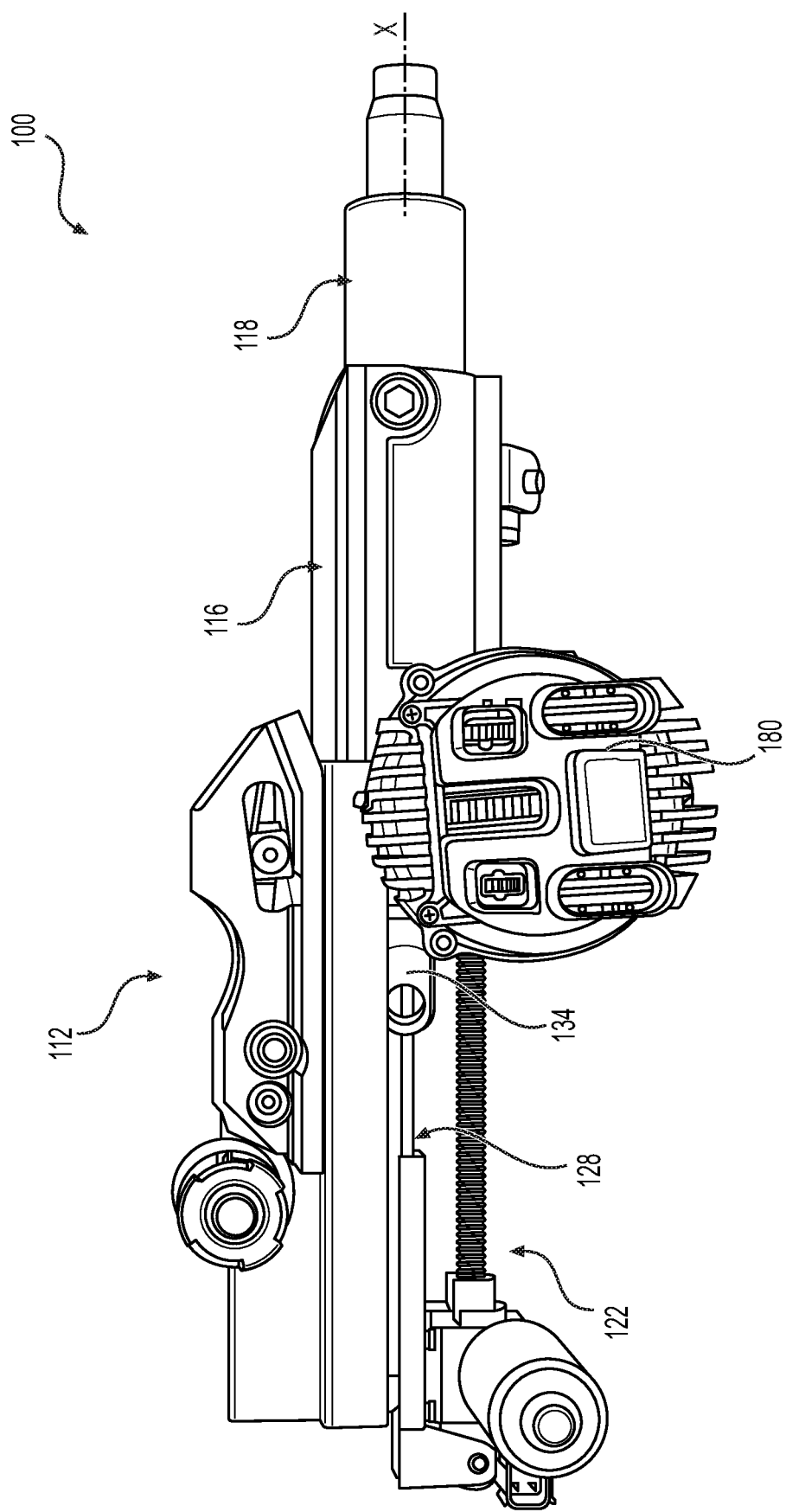
FIG. 4 is a side view of the steering column in a fully expanded state depicting telescopic connection between the pair of telescoping jackets, slidable connection of the bracket, and translational connection of a shaft component of the steering column.
Figure 5:
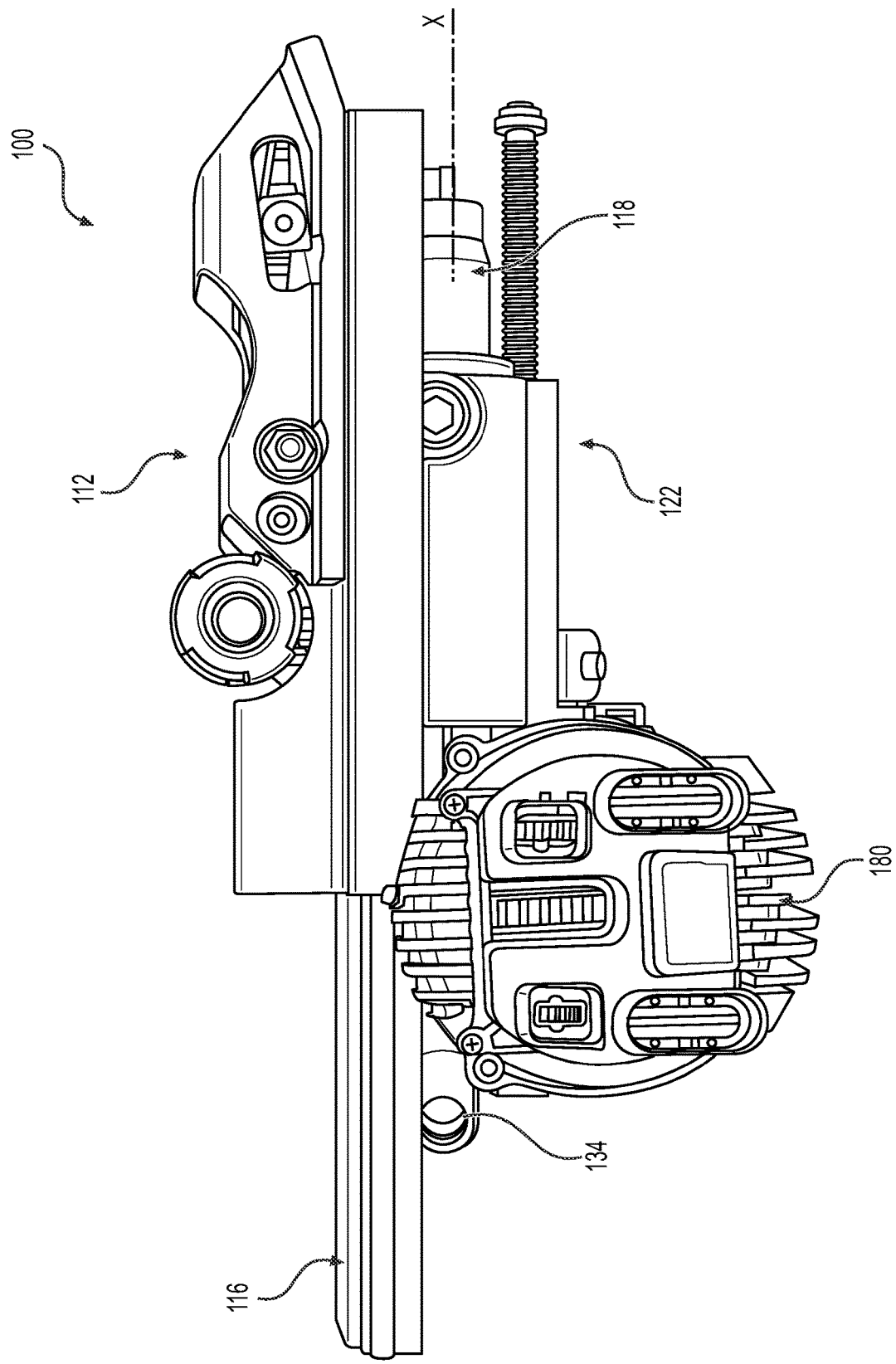
FIG. 5 is a side view of the steering column in a fully contracted state (stowed position) further depicting telescopic connection between the pair of telescoping jackets, slidable connection of the bracket, and translational connection of a shaft component of the steering column.

FIG. 4 illustrates the steering column 102 in a fully expanded state, wherein the length between the first end 104 and the second end 106 has a maximum length Lmax. FIG. 5 illustrates the steering column 102 in a fully contracted state, wherein the length between the first end 104 and the second end 106 has a minimum length Lmin. It should be appreciated that the shaft 134 is axially connected to the lower jacket 116 such that it travels axially therewith during expansion and contraction. This conjoint axial movement of the shaft 134 and the lower jacket 116 may be defined as translational movement. As such, the translational movement of the shaft 134 provides for a greater range of axial movement and settings. An electronic port box 180 connects the electrical housing 170 to one or both of the longitudinal actuator 122 and the rake adjustment actuator 172. The electrical housing 170 includes a controller 182 (FIG. 2) for providing instructions for various methods and functionalities that will be described in greater detail below.

Figure 6:
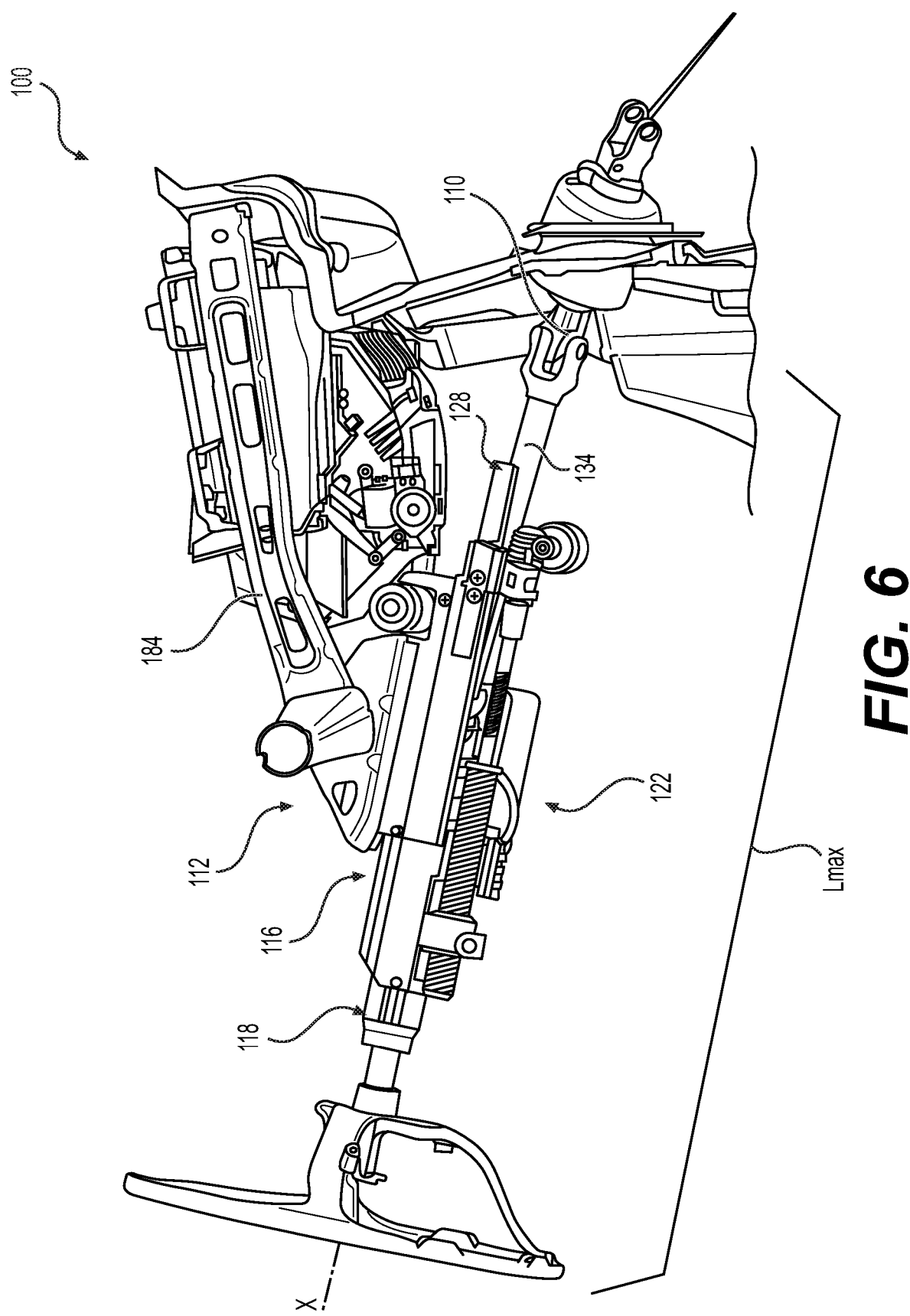
FIG. 6 is yet another isometric view of the steering column assembly wherein the steering column is in the fully expanded state and has been tilted about the pivot axis via the rake bracket assembly.
Figure 7:
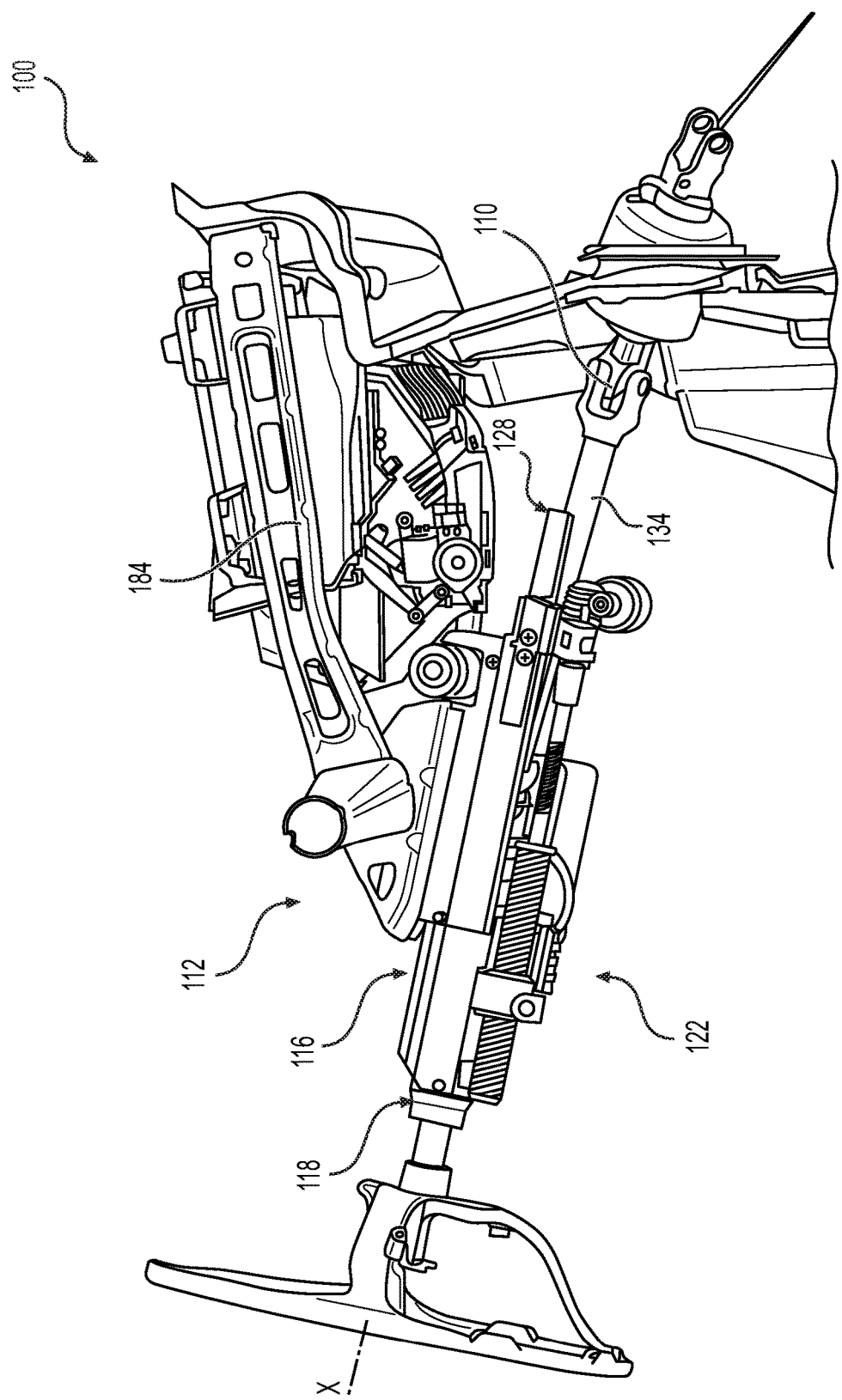
FIG. 7 is another isometric view of the steering column assembly wherein it has been partially contracted along the longitudinal axis.
Figure 8:
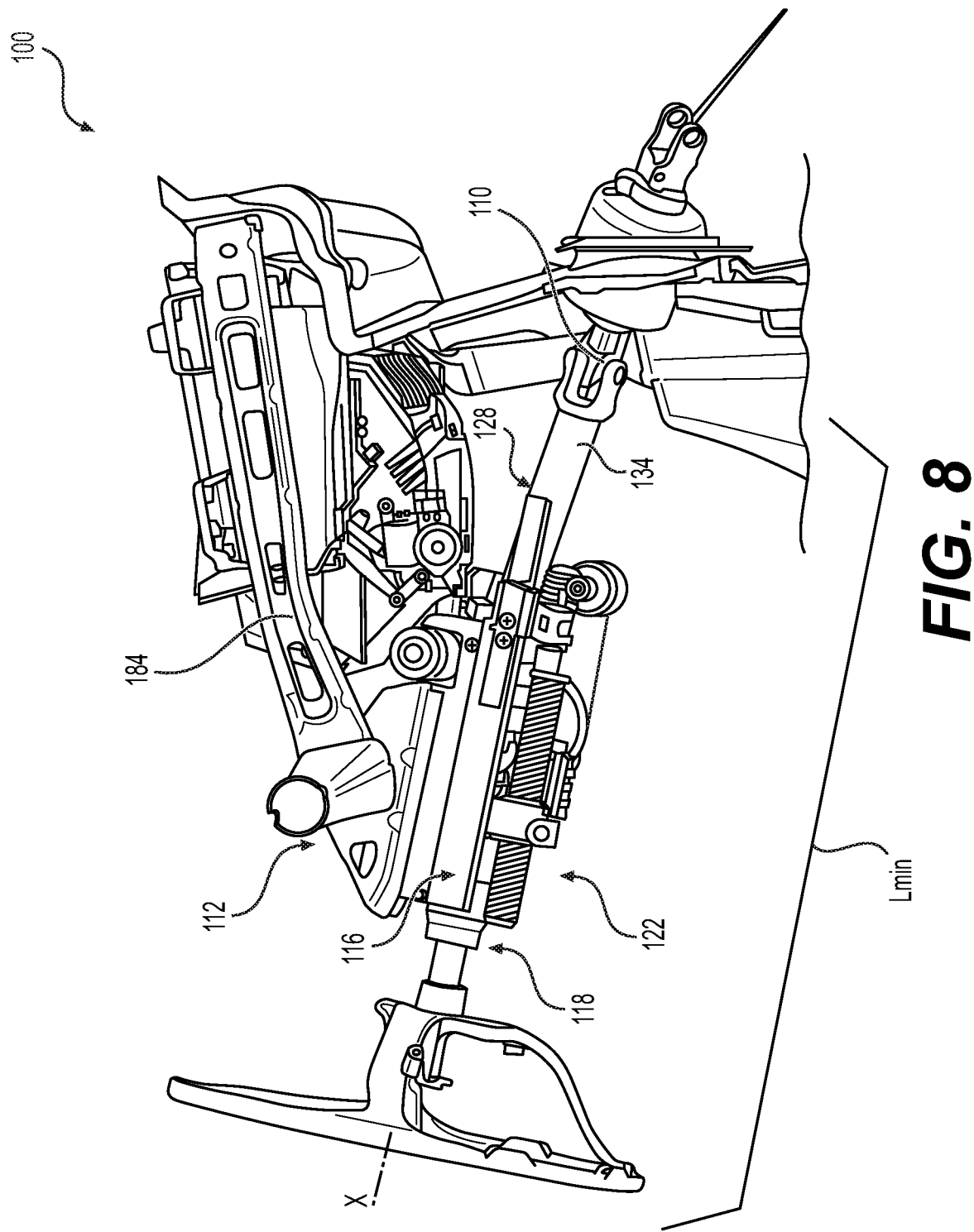
FIG. 8 is an isometric view of the steering column assembly wherein it has been fully contracted along the longitudinal axis.

FIG. 6 is an isometric view of the steering column assembly 100 wherein the steering column 102 is in the fully expanded state and has been tilted about the pivot axis 114 via the rake bracket assembly 112. The mounting bracket 120 is attached to a component 184 of the vehicle, such as part of the frame. FIG. 7 is another isometric view of the steering column assembly 100 wherein it has been partially contracted along a longitudinal axis X. It should be appreciated that the initial movement or first stage moves the outer spindle shaft 130 relative to the spindle nut 126 as it is driven by motor 123. The longitudinal actuator 122 actuator may be configured such that this initial movement, wherein the only relative movement is between the outer spindle shaft 130 and the spindle nut 126, results in only telescopic movement. In other words, the during the initial movement, the lower jacket 116 may not move relative to the sliding bracket 128. FIG. 8 is an isometric view of the steering column assembly 100 wherein it has been fully contracted (stowed) along a longitudinal axis X. When stowed, the vehicle may be on an autonomous driving setting. After the initial movement a second stage of actuation occurs, wherein the inner spindle shaft 132 starts to become drawn into the outer spindle shaft 130 and effectuates movement between the lower jacket 116 and the sliding bracket 128 only. In other words, the second stage of longitudinal actuation includes both sliding and translational movement. As such, rotational and/or axial connection between the outer and inner spindle shafts 130, 132 may require greater force to effectuate than that of the outer spindle shaft 130 and spindle nut 126 to provide a two stage expansion and contraction. However, it should be appreciated that other arrangements may provide relative stages in the reverse order or a singular stage that allows telescopic, slidable, and translational movement at the same time.

Actuation of the rake adjustment actuator 172 and/or the longitudinal actuator 122 may be manual with one or more release levers (not shown) or may be electronic via one or more controllers 182. For example, the controller 182 may be located in electrical housing 170 and may initiate either longitudinal movement or tilt movement as a result of the selection of an autonomous driving. In addition, the controller 182 and other components of the subject disclosure may work in conjunction with one or more additional electronic components, mechanical components, or method steps such as those described U.S. Pat. No. 9,550,514, titled "RETRACTABLE STEERING COLUMN SYSTEM WITH AIR BAG, VEHICLE HAVING THE SAME, AND METHOD"; U.S. Pat. No. 9,828,016, titled "RETRACTABLE STEERING COLUMN SYSTEM, VEHICLE HAVING THE SAME, AND METHOD"; U.S. Pat. No. 9,809,155, titled "RETRACTABLE STEERING COLUMN ASSEMBLY HAVING LEVER, VEHICLE HAVING RETRACTABLE STEERING COLUMN ASSEMBLY, AND METHOD"; U.S. Pat. No. 9,840,271, titled "RETRACTABLE STEERING COLUMN WITH RAKE LIMITER"; and U.S. Pat. No. 10,577,009B2, titled "RETRACTABLE STEERING COLUMN ASSEMBLY AND METHOD" features and aspects of which are each incorporated in their entirety herein.

It should be appreciated that some arrangements of the steering column assembly 100 can include two or more actuators and/or three or more jackets. These designs can increase the amount of stow capability compared to one actuator and two jackets for a given package space. Some end use applications require further conservation of space, and further cost reduction. For example, in arrangements with two actuators, one actuator may provide only telescopic movement and another actuator (not shown) may provide only sliding movement. The actuators may work in unison or in stages as previously detailed per instructions from the controller 182.

The steering column assembly 100 can significantly increase the amount of stow capability that can be achieved for any vehicle compared to a conventional telescoping mechanism. The steering column assembly 100 can provide a greater amount of axial travel and stow capacity than single jacket designs. For example, embodiments can provide axial travel that is greater than 100 mm, greater than 150 mm, greater than 200 mm, or even greater than 250 mm (e.g., 260 mm). Such versions of the steering column assembly 100 can package between the rear of dash and the front of dash for almost any passenger vehicle.

The steering column assembly 100 can utilize the available space in an environment in a more efficient way. For example, in steer-by-wire applications, this design can be improve performance. Although applications having a large hand wheel actuator requiring additional space can restrict the effective use of the space for stow or storage of the steering column assembly 100 (and hand wheel actuator), the embodiments disclosed herein can overcome such limitations. The steering column assembly 100 can telescope different portions at the same time, or sequentially, during the stowing of the steering column assembly Further embodiments may alternatively include a single actuator and three or more telescopically attached jackets with our without the sliding bracket 118 to provide a stow capability within an end use environment. For example, a first jacket can be pinned at the rack pivot point. In some versions, a second jacket can move relative to the pinned first jacket. Embodiments can include a third jacket that can further move relative to the second jacket. The single actuator can adjust the position of the third jacket relative to the first jacket, such that the second jacket can float between the first jacket and the third jacket. The single actuator can be coupled to the third jacket through an aperture or 'window' in the second jacket Any feature, element, component or advantage of any one embodiment can be used on any of the other embodiments.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly, comprising:
  a steering column extending along a longitudinal axis between a first end and a second end and having a hand wheel location on the first end and a rotational output on the second end;
  the steering column including an upper jacket located at the first end, a lower jacket telescopically connected to the upper jacket and extending towards the second end, and a sliding bracket slidably connected to the lower jacket and extending further towards the second end, the lower jacket further including a shaft extending to the rotational output, wherein axial movement of the lower jacket is translated to the shaft, wherein the shaft connects to the rotational output with a splined inner bore that permits axial play between the shaft and the rotational output; and
  at least one longitudinal actuator that telescopically moves the upper jacket with respect to the lower jacket and slidably moves the lower jacket with respect to the sliding bracket.

2. The steering column assembly of claim 1, wherein the rotational output includes at least one of a cardan joint or yoke.

3. The steering column assembly of claim 1, wherein the at least one longitudinal actuator includes exactly one longitudinal actuator.

4. The steering column assembly of claim 1, further including a rake bracket assembly that facilitates rake movement of the steering column about a pivot axis that is transverse to the longitudinal axis.

5. A steering column assembly, comprising:
  a steering column extending along a longitudinal axis between a first end and a second end and having a hand wheel location on the first end and a rotational output on the second end;
  the steering column including an upper jacket located at the first end, a lower jacket telescopically connected to the upper jacket and extending towards the second end, and a sliding bracket slidably connected to the lower jacket and extending further towards the second end, wherein the lower jacket is an outer jacket defining a bore that telescopically receives the upper jacket; and at least one longitudinal actuator that telescopically moves the upper jacket with respect to the lower jacket and slidably moves the lower jacket with respect to the sliding bracket, wherein the upper jacket includes a track that defines a groove along which ball bearings reside to facilitate telescopic movement of the lower jacket and reduce lash.

6. The steering column assembly of claim 5, wherein the at least one longitudinal actuator connects to the upper jacket through a window in the lower jacket.

7. A steering column assembly, comprising:
- a steering column extending along a longitudinal axis between a first end and a second end and having a hand wheel location on the first end and a rotational output on the second end;
- the steering column including an upper jacket located at the first end, a lower jacket telescopically connected to the upper jacket and extending towards the second end, and a sliding bracket slidably connected to the lower jacket and extending further towards the second end; and
- at least one longitudinal actuator that telescopically moves the upper jacket with respect to the lower jacket and slidably moves the lower jacket with respect to the sliding bracket, wherein the at least one longitudinal actuator is configured to include a first stage wherein the upper jacket moves telescopically relative to the lower jacket and a second stage that occurs after the first stage wherein the lower jacket slides relative to the sliding bracket.

8. The steering column assembly of claim 7, wherein the longitudinal actuator includes an outer spindle shaft and an inner spindle shaft, wherein the outer spindle shaft includes a bore for threadingly receiving the inner spindle shaft.

9. The steering column assembly of claim 8, wherein a spindle nut is threadingly engaged to an exterior of the of the outer spindle shaft and is caused to rotate by a motor thereby axially moving the outer spindle shaft.

10. A steering column assembly, comprising:
- a steering column extending along a longitudinal axis between a first end and a second end and having a hand wheel location on the first end and a rotation output on the second end;
- the steering column including an upper jacket located at the first end and a lower jacket telescopically connected to the upper jacket and extending towards the second end;
- the lower jacket including a shaft extending to the rotational output, wherein the shaft includes a splined inner bore and the rotational output is at least partially received in the splined inner bore for permitting play along the longitudinal axis; and
- a longitudinal actuator that telescopically moves the upper jacket with respect to the lower jacket and further causes translating movement of the shaft with respect to the lower jacket.

11. The steering column assembly of claim 10, wherein the rotational output includes one of a cardan joint or yoke.

12. The steering column assembly of claim 10, further including a sliding bracket slidably connected to the lower jacket and extending further towards the second end, the longitudinal actuator further causing sliding movement between the lower jacket and the sliding bracket.

\* \* \* \* \*